C. H. BINGHAM.
BLAST FURNACE.
APPLICATION FILED AUG. 1, 1918.
1,303,155.
Patented May 6, 1919.
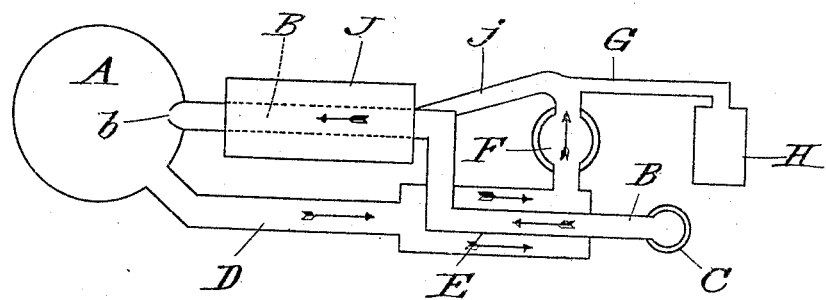

UNITED STATES PATENT OFFICE.

CHARLES HENRY BINGHAM, OF LONDON, ENGLAND.

BLAST-FURNACE.

1,303,155.  Specification of Letters Patent.  Patented May 6, 1919.

Application filed August 1, 1918. Serial No. 247,835.

*To all whom it may concern:*

Be it known that I, CHARLES HENRY BINGHAM, a subject of the King of Great Britain, residing at 11 Queen Victoria street, in the city and county of London, England, have invented certain new and useful Improvements in or Relating to Blast-Furnaces, of which the following is a specification.

This invention relates to blast furnaces and especially to the heating of the air blast, the cooling of the blast furnace gases and the recovery of the potash dust from the blast furnace gases.

According to this invention, the air blast is supplied through a heat interchanger heated by the hot blast furnace gases, which are cooled by the incoming air and then pass through a dust extractor of suitable type in which the potash dust is intercepted and collected. Part of the object of the invention—the increasing of the quantity of surplus gas—can however be attained without extracting the dust.

The accompanying diagram illustrates the new method of simultaneously heating the air blast by and recovering the potash dust from the escaping blast furnace gases.

A is the furnace. B is the air blast supply pipe, terminating at $b$ in twyers and fed with cold air from the air compressor C. D is the furnace gas outlet pipe. E is a heat exchanger comprising in the diagrammatic illustration a portion of the air supply pipe B and a channel continuous with the gas outlet pipe D. The diagram illustrates the principle only and the interchanger may be of any suitable type, comprising tubes or cells or other known arrangement. F is the dust extractor. G is a gas channel leading from the extractor F to a boiler furnace H in which the gases are burnt. J is a hot stove such as is commonly employed to heat the air blast, fed through the pipe $j$ with a portion of the furnace gases after extraction of the potash dust.

The blast furnace gases as they escape from the furnace A are at a comparatively high temperature, usually over 400° C., and the heat interchanger E causes a considerable part of the heat of the gases to be utilized in heating the cold air entering through the air blast pipe or channel B. The heat so supplied to the air is however usually not sufficient to raise it to the desired temperature for admission to the blast furnace through the twyers and additional heat is supplied by the hot stove J. The preliminary heating however greatly economize the use of gas in the hot stove, the interchanger usually supplying about one half of the heat required.

The gases after passing through the heat interchanger E are usually now at a sufficiently reduced temperature to allow of the use of filtering bags in the dust extractor F and the dust is removed in the extractor before the cooled gases pass to the boiler furnace H. The branch pipe $j$ takes off to the hot stove J such a proportion of the gases as is found necessary to complete the heating of the air blast, the gases being burnt in the hot stove in the usual manner. The amount required for this purpose is however greatly reduced owing to the employment of the interchanger E and a much larger proportion of the gases is therefore available for power or other purposes.

What I claim and desire to secure by Letters Patent of the United States is:—

1. In a blast furnace plant, a furnace gas outlet channel, an air blast supply channel and a dust extractor through which the said furnace gas passes after cooling in the heat interchanger.

2. In a blast furnace plant, a furnace gas outlet channel, an air blast supply channel, a dust extractor through which the said furnace gas passes after cooling in the heat interchanger and a hot stove for the air blast, fed by a portion of the cooled furnace gas.

CHARLES HENRY BINGHAM.

Copies of this patent may be obtained for five cents each, by addressing the "Commissioner of Patents, Washington, D. C."